United States Patent [19]
Kudale et al.

[11] 3,739,713
[45] June 19, 1973

[54] INJECTING APPARATUS

[75] Inventors: Jagannath M. Kudale, Minneapolis; Donovan H. Lumby, Brooklyn Center, both of Minn.

[73] Assignee: Land O'Lakes, Inc., Minneapolis, Minn.

[22] Filed: Apr. 17, 1972

[21] Appl. No.: 244,804

[52] U.S. Cl.......................... 99/533, 99/483, 99/487
[51] Int. Cl..... A23b 1/16, A22c 21/00, A47j 43/16
[58] Field of Search............................ 99/532, 533; 27/24 R; 128/215, 216

[56] References Cited
UNITED STATES PATENTS

| 3,016,004 | 1/1962 | Harper, Jr. et al. | 99/533 |
|---|---|---|---|
| 3,035,508 | 5/1962 | Nelson | 99/533 |

*Primary Examiner*—Wayne A. Morse, Jr.
*Assistant Examiner*—Arthur O. Henderson
*Attorney*—Frederick E. Lange and William C. Babcock

[57] ABSTRACT

An injecting apparatus and method for injecting a liquid additive at high pressure into an object having converging opposite ends, such as a fowl, in which there is a table upon which the object is placed, a set of nozzles for engaging one end portion of the object, a clamping member for engaging and partially surrounding the opposite end portion, and means for clamping the object between the nozzles and the clamping member while the fluid liquid additive is being injected. The nozzles are formed in two groups which vary in length and disposition with respect to each other in such a manner that their terminal portions approximately conform with the surface of the object to be injected, such as the breast of a fowl. The passages through the nozzles also vary in size so that a greater amount of liquid is introduced into certain portions of the object requiring more liquid additive, such as the breast portion of a fowl. The table is vertically adjustable to enable proper positioning of the object to be injected with respect to the nozzles. The means for injecting the liquid includes a piston and cylinder and there is means for adjusting the stroke of the piston and hence the amount of liquid additive which is injected. In injecting the liquid into a yieldable object such as a fowl, the fowl is compressed during the injecting operation to prevent escape of the liquid additive, and after the injecting operation is completed, is released to assume its normal shape.

12 Claims, 5 Drawing Figures

Patented June 19, 1973
3,739,713
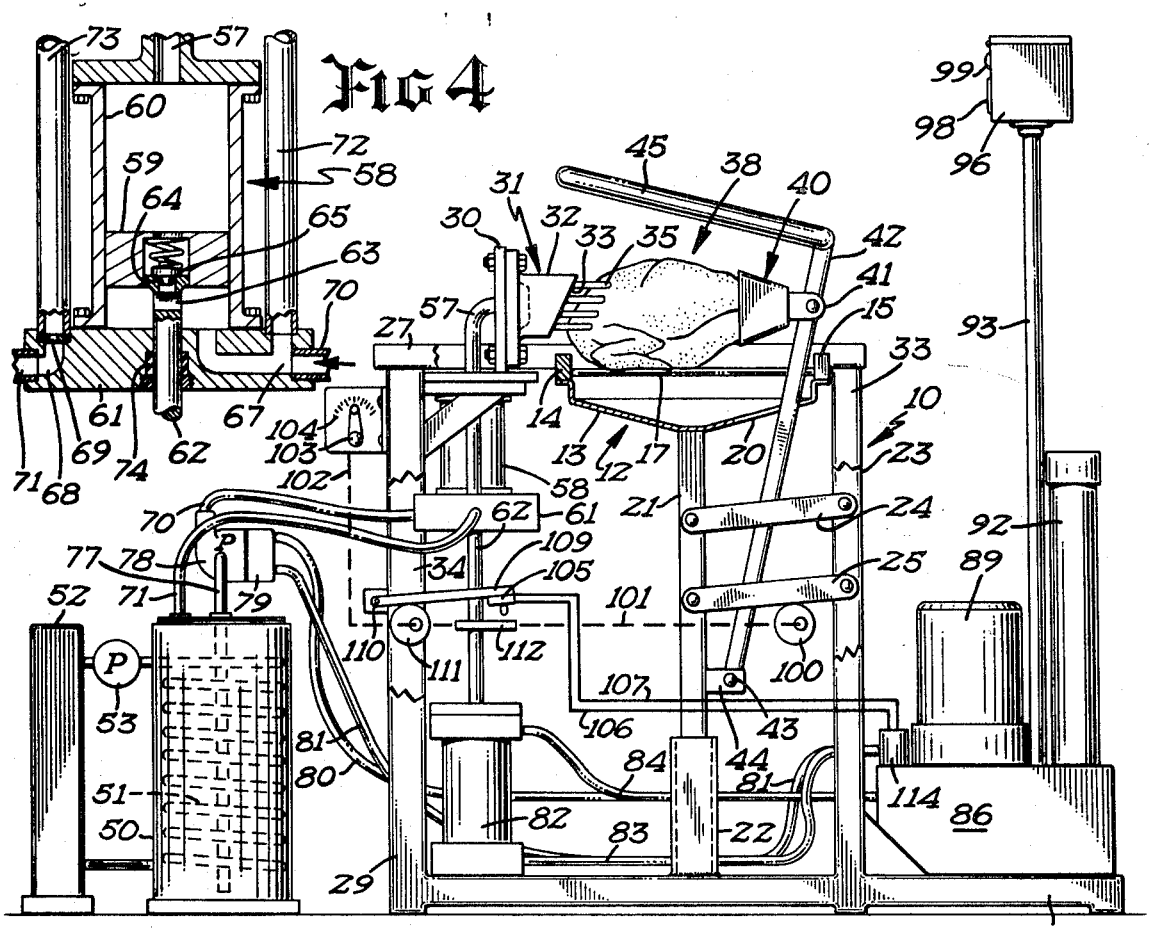
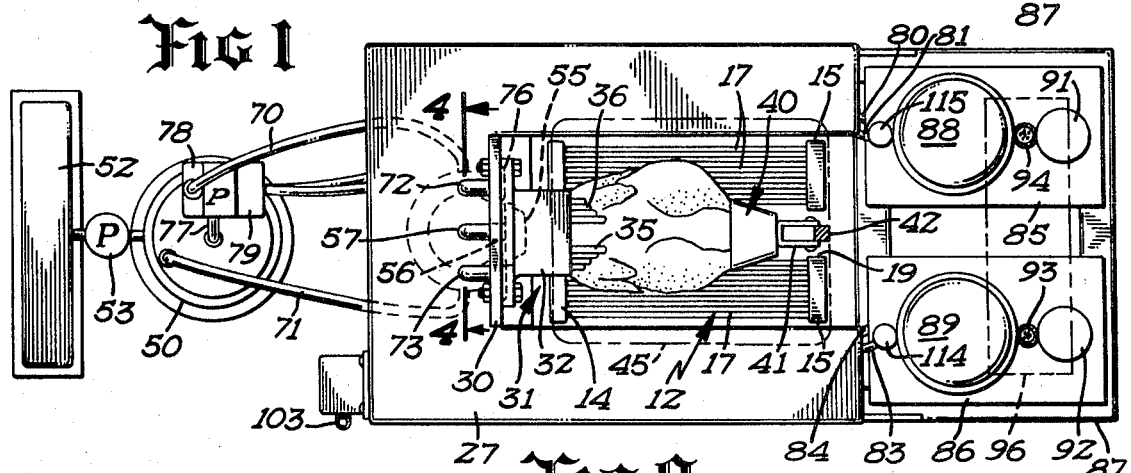
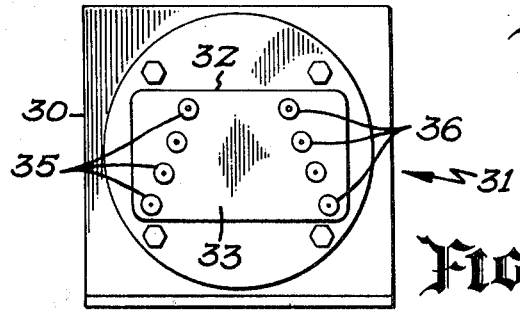
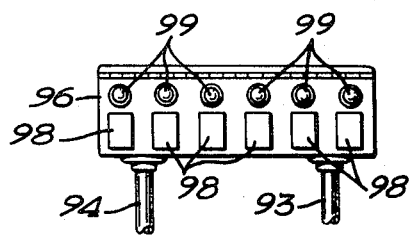

INJECTING APPARATUS

BACKGROUND OF THE INVENTION

Various attempts have been made in the past to introduce a treating agent or additive, such as butter or oil, into fowl prior to cooking the same. By introducing some edible fat into the fowl below the skin, the need for basting is reduced. Furthermore, the edible oil is distributed through the bird during cooking and provides for a more "moist" turkey when cooked.

One of the problems in connection with the introduction on a commercial scale of such an additive into fowl is that of providing apparatus by which the additive can be introduced relatively quickly and with a minimum amount of manual attention. Furthermore, it is desirable that the additive be introduced with a minimum amount of puncturing of the skin. When the skin is punctured, the fat tends to ooze out during cooking through the openings leaving colored spots in the skin at the point where the fat leaves the skin. It is also desirable that the additive be introduced so that it is relatively uniformly distributed.

The Tichy U.S. Pat. No. 2,418,914 teaches the introduction of various materials, including butter, into meat by a high pressure spray. The suggestion is made that the meat may include fowls although no particular mention is made of any problems in connection with the introduction of the fat into fowls as distinguished from other forms of meat. While Tichy recognizes that the substances are introduced into the meat without a visible point of entry, due to the very high speed at which the particles are introduced, it is believed that his process would not result in any great scattering of the fat through the meat. Furthermore, Tichy does not disclose any apparatus suitable for use in commercial production.

The Harper et al U.S. Pat. No. 3,016,004 does disclose an apparatus and a process for introducing a fluid under high pressure into meat using a number of nozzles in which the orifices are substantially greater than those proposed by Tichy. Thus, the arrangement of the Harper et al patent would result in the introduction of greater quantities of the fluid into the meat. The Harper et al patent, however, is primarily concerned with injecting a curing liquid into a relatively flat piece of meat, such as bacon, and is not concerned with the problem of injecting an edible fat into an irregularly shaped meat product such as fowl.

The Schwall et al U.S. Pat. No. 3,366,491 is concerned specifically with a process for injecting fat into poultry and discloses running a large number of needles through the skin of the bird. This results in a much better distribution of the edible fat into the poultry. In order, however, to obtain such better distribution, it is necessary to employ a very large number of needles and each of these needles leaves an opening through the skin through which the basting fluid oozes out during the cooking operation to produce the colored spots in the skin mentioned above.

The Strandine et al U.S. Pat. No. 3,511,164 attempts to overcome the problem of a better distribution of the fat through the poultry, without puncturing the skin, by inserting relatively long needles parallel to the pectoral muscles, the needles being inserted through the posterior opening. The needle or needles are preferably kept entirely within the Pectoralis superficialis. The method employed by the Strandine et al patent, by reason of the fact that the needles have a number of lateral openings, tends to result in introduction of the edible fat at a number of points in the poultry. The fat still, however, tends to collect in pockets. Furthermore, the method employed by Strandine et al involves the insertion of needles along definite paths and the careful insertion of these needles requires a substantial amount of time.

Both the Earl et al U.S. Pat. No. 3,232,209 and the Panek U.S. Pat. No. 3,556,808 are concerned with apparatus for injecting predetermined amounts of an additive through needles which are inserted into the meat. There is no provision, however, for properly placing the meat with respect to the needles or of handling meat such as poultry having opposite ends which converge towards their outer extremities. Furthermore, these patents again employ needles which puncture the skin, if the apparatus is employed with fowl.

The arrangements of Strandine et al, Schwall et al, Earl et al, and Panek, previously mentioned, all have the further disadvantage that the insertion of needles through the skin may result in the introduction of bacteria into the interior of the bird and the transfer of bacteria from one fowl to another. It is quite common, despite efforts to avoid it, for there to be a certain amount of bacteria present on the skin of any poultry product. One form of bacteria may be salmonella. Normally, this bacteria remains on the surface of the skin and is partially destroyed upon freezing and further destroyed when it is subsequently cooked. Where, however, needles are inserted through the skin before a poultry has been fully frozen, the bacteria on the skin may be carried into the interior. Furthermore, unless extreme care is taken to sterilize the needles between each operation, bacteria from one bird may be transferred to another.

A further disadvantage of any apparatus employing needles is that the poultry must be quite cold in order to prevent the excessive loss of body juices when the needles are removed.

SUMMARY OF THE INVENTION

The present invention is concerned with an apparatus for injecting a liquid additive into an object having converging end portions, such as a fowl. The invention is particularly designed for use with a fowl but does have applications in other fields. The apparatus has means for injecting the liquid additive under high pressure through the nozzles so that the liquid penetrates the skin without appreciably rupturing the same. A table is provided which supports the fowl or other object during injection and there are a plurality of nozzles for engaging one end of an object and a clamping member engaging the other end of the object. The clamping member and nozzles are brought together to clamp the fowl or other object between them during the injection procedure. The clamping member preferably partially surrounds the portion of the object which it engages so as to retain it firmly in position. The table upon which the object is placed is disposed the proper distance beneath the clamping member and the nozzle assembly.

The table is preferably adjustable in order to accommodate the apparatus for different sized fowl and to insure that the nozzles are in a proper position with respect to the breast of the fowl or other object to be injected. The table may also be provided with longitudinal guide means to insure that the fowl remains parallel to the table during the injecting process.

There are preferably two groups of nozzles, where the object being injected is a fowl. The two groups are disposed on opposite sides of the longitudinal center of the fowl and the nozzles vary in length and disposition with respect to each other so that their terminal portions approximately conform with the breast of the fowl. Furthermore, the passages through the nozzles are preferably of varying sizes so that the openings in the nozzles adjacent the portions having the larger amount of flesh are larger than the other of the nozzles so that a greater amount of liquid additive is introduced into the portions of the fowl having the greater amount of flesh to be injected.

In carrying out our method of injection, the fowl is preferably clamped with sufficient force that the nozzles all firmly engage the breast of the fowl and so that the fowl is compressed to prevent escape of the fluid additive. After the injection operation is completed, the fowl is quickly released to permit the fowl to return to substantially its original shape while preventing escape of the fluid additive as the fowl is withdrawn from engagement with the nozzles.

As pointed out above, while the apparatus and process are particularly concerned with the injection of turkeys, they are applicable to other objects where the objects converge towards their opposite ends. Other objects and features of the invention will be apparent from a consideration of the accompanying specification, claims and drawing.

BRIEF DESCRIPTION OF THE DRAWING

FIG. 1 is an elevational view of our improved apparatus shown partly schematically;

FIG. 2 is a plan view of the same apparatus;

FIG. 3 is an elevational view of the injection head;

FIG. 4 is a vertical sectional view of the pump for supplying liquid additive to the injection head, the section being taken along the line 4—4 of FIG. 2; and FIG. 5 is a fragmentary view showing the electrical control box.

DESCRIPTION OF THE PREFERRED EMBODIMENT

Referring first to FIG. 1, the numeral 10 generally indicates a frame upon which the injecting apparatus is mounted. The injecting apparatus comprises a table 12 comprising a pan 13 to which is secured a pair of bars 14 and 15 supporting a plurality of parallel rods 17. The innermost of the rods 17 are spaced apart a substantial distance to provide a recess in which the backbone of the turkey can rest. The bar 15 has a recess 19 cut therethrough which is aligned with a similar recess 20 in the bottom of the pan. This recess is also in line with the space between the innermost of the bars 17 so that an opening extends through the central portion of the pan and the table for a substantial distance and for a purpose presently to be described. The pan 13, the bars 14 and 15 and the rods 17 are supported on a post 21 mounted on a guide 22 for vertical movement. The post 21 is connected to a post 23 of the frame 10 by a pair of pivoted links 24 and 25. It will be obvious that because of the pivotal connection provided by links 24 and 25, post 21 will remain in a parallel relationship with respect to bar 23 as it is moved upwardly and downwardly by means later to be described. The cross-sectional area of post 21 is substantially smaller than the cross-sectional area of the interior of guide 22 to permit lateral movement of post 21 as the ends of links 24 and 25 connected to the post travel an arcuate path as they move up and down. Partially surrounding the table 12 is a platform 27. This platform is supported by post 23, and further posts 29, 33, 34, and other posts (not shown). Secured to this platform 27 is a vertical bracket 30 to which in turn is secured an injection head 31. The injection head 31 has a housing 32 having a front wall 33 which slopes downwardly and backwardly. Extending out of the front wall are two rows of nozzles 35 and 36. As is evident from FIG. 3, these nozzles diverge from each other moving from top to bottom. Furthermore, as is evident from FIG. 1, the nozzles extend outwardly from the back wall of head 31 progressively shorter distances starting from the top. As will be discussed in more detail later, the nozzles have apertures of varying sizes, the apertures of the uppermost nozzles being larger than those of the lowermost nozzles. This is shown in FIG. 3 in which the orifices are represented by central dots. It will be noted that the orifices of the top nozzles 35 and 36 are larger than those of the lower ones. The orifices through the upper nozzles are made larger because of the fact that there is a greater amount of meat adjacent the lower portion of the breast than near the upper portion. The angular disposition of the nozzles and the varying length are designed to make the ends of the nozzles conform with the contour of the breast of a turkey or other similar fowl. As will be noted in FIGS. 1 and 2, in which a turkey 38 is shown as disposed on the table 12, the turkey is positioned on its back so that the lower portion of the breast is adjacent the uppermost of the nozzles 35 and 36 and so that the backbone of the turkey is disposed between the inner of the rods 17. Because of this arrangement, the turkey tends to be held in a longitudinal position and the spaced bars resist turning of the turkey with respect to the table.

It will also be noted that with the turkey lying on its back, the longitudinal axis of the nozzles 35 and 36 is disposed at an angle of approximately 45° with respect to the front wall of the breast of the turkey. The pectoral muscles of the turkey tend to run generally parallel to the lower surface of the turkey (the upper surface in the drawing). The nozzles thus tend to be disposed at an angle of approximately 45° or less with respect to the pectoral muscles. It has been found that it is desirable that the fluid be injected at an angle of from 15° to 60° with respect to the general disposition of the pectoral muscles.

Disposed at the opposite end of the fowl 38 from the nozzles 35 and 35 is a posterior engaging member 40 shaped in the form of a frustrum of a hollow pyramid which is shown as square in cross-section. In other words, the posterior engaging member has four sloping straight walls, all of which slope inwardly as they approach the rear of member 40. These walls are thus designed to engage and partially surround the posterior portion of the fowl 38 so as to hold it firmly against sidewise movement. Secured to the rear of the posterior engaging member 40 is a yoke 41 which is pivotally secured to a bar 42. This bar 42 is, in turn, pivotally secured at 43 to an ear 44 secured to the vertical post 21. Rigidly secured to the upper end of bar 42 is a handle member 45 which projects in the general direction of the injection head 31. It will be readily apparent that an operator standing to one side of the machine, by gasping handle 45, can pull the bar 42 forwardly about the pivot 43 and press the clamping member 40 into engagement with the turkey 38, moving the breast portion of the same against the nozzles 35 and 36. As has been previously pointed out, despite the fact that the fowl tends to be somewhat soft and resilient, it is held against any twisting movement by reason of the backbone extending into the recess between the innermost bars 17 and by reason of the cupping engagement between the clamping member 40 and the rear of the bird. Furthermore, the nozzles 35 and 36 are disposed so as to engage the bird on opposite sides and further retain the same against sidewise movement.

The means for supplying the liquid additive to the nozzles 35 and 36 will now be described. The liquid additive is normally maintained in a tank 50 through which runs a heating coil 51. This heating coil is supplied with hot water from a suitable source 52 of hot water, there being a pump 53 to circulate the water from the source 52 through the coil 51. It is, of course, to be understood that an ordinary domestic source of hot water may be employed for supplying the water to coil 51 in which case the normal pressure exerted on the water would make unnecessary the provision of a pump, such as pump 53. As a result of the heating coil 51, the additive is kept in a liquid state. One additive which is particularly desirable in the case of fowl is butter which is normally relatively solid at room temperatures. By heating it through the use of a heating coil, such as coil 51, the butter is maintained in a liquid state.

Referring to the injector head 31, the housing 32 has a hollow portion which hollow portion is indicated in dotted lines by the reference numeral 55. The inner portions of nozzles 35 and 36 are connected by passages not shown to hollow portion 55. This hollow portion communicates with a throat 56 which, in turn, is connected to a supply pipe 57. The supply pipe 57 forms an integral extension of the outlet of a pump 58. The pump 58 is shown in section in FIG. 4. It will be noted that the pump has a piston 59 movable within a cylinder 60. The cylinder 60 is secured in fluid-tight relation to a fluid distributor block 61. The piston 59 is secured to a piston rod 62 which has a transverse passage 63 extending therethrough. Communicating with the transverse passage is a valve seat 64 against which seats a spring pressed valve 65. The fluid distributor block 61 has an inlet passage 67 and an outlet passage 68. A restrictor 69 is placed in the outlet passage. The inlet passage 67 communicates with the space beneath the piston 59 and is in communication with the transverse passage 63.

The inlet passage 67 is connected to a conduit 70 and the outlet passage 68 to a conduit 71. Secured to the distributor block 61 are two pipes 72 and 73. Both conduits are secured to the block in fluid-tight relation, pipe 72 being in communication with the inlet passage 67 and pipe 73 in communication with the outlet passage 68 through the restrictor 69. A suitable seal 74 is provided in the block 61 to guard against loss of fluid around the piston rod 62. As best shown in FIG. 2, the vertical pipes 72 and 73 are connected to the housing 32 of the injector head. These pipes communicate with an annular passage 76 in housing 32 which extends annularly around a substantial part of the circumferential portion of the housing 32. One end of the passage 76 communicates with the pipe 72 and the opposite end with the pipe 73. It will thus be apparent that fluid entering the inlet passage 67 can pass up through pipe 72 around through the inner portion of the injector head, through the passage 76 and out through passage 73, the restrictor 69 to pipe 71.

Inlet pipe 70 connects with the outlet of a pump 78 operated by a hydraulic motor 79. The inlet of the pump 78 is connected through a pipe 77 to the interior of the tank 50 containing heated butter or other liquid additive. The pipe 77 preferably extends to a point adjacent the bottom of tank 50. Pipe 71 connected to the outlet of pump 58 is also connected to tank 50 and acts as a return line. Thus, when the pump is operating and no liquid is being injected into a fowl, the liquid fluid flows from tank 50, through the pump 78, pipe 70, inlet passage 67 of pump 58, pipe 72, the annular passage 76 of housing 32, pipe 73, the restrictor 69, and the return pipe 71 back to the tank 50. Thus, heated fluid is constantly circulated through the injector head 31 to maintain it at a proper temperature so that when liquid additive is introduced through pipe 57 for injection through the nozzles 35 and 36, the liquid additive will not be cooled upon being introduced into the injector head.

The hydraulic motor 79 is operated by a hydraulic fluid pump through two pipes 80 and 81, pipe 81 being the supply pipe and pipe 80 the return pipe. While we have shown hydraulic motor 79 schematically as a rotary motor, this is for purposes of illustration only and it is to be understood that any suitable hydraulic motor can be employed, such as a reciprocating piston type of motor. In this case, the pump 78 could be a reciprocating piston type of pump, such as pump 58.

Referring to the operation of pump 58, when piston rod 62 is moved upwardly, the valve 65 in the piston 59 is held closed by the spring engaging the same and by the downward pressure of the liquid. The liquid above the piston 59 is thus forced upwardly through pipe 57. At the same time, due to the fact that the valve 65 is closed, liquid additive supplied by pump 78 through pipe 70 flows in on the underside of the piston 59, filling the space in the cylinder beneath the piston 59. When the piston rod 62 moves downwardly, valve 65 is forced off of its seat and liquid beneath the piston 59 flows through the transverse passage 63 and past the valve 65 to the space above the piston 59. Thus, the space in the cylinder 60 above the piston 59 is refilled ready for the next upward movement of piston 59. Because of the restrictor 69 in the return line, there is always sufficient pressure in the inlet passage 67 to force valve 65 off of its seat as the piston 59 moves downwardly. It is to be understood that the pressure of the fluid flowing through pipe 57 is much higher than that supplied by pump 78. All that the pump 78 needs to do is to supply sufficient pressure to insure adequate circulation of the fluid through the head 31 and to provide an adequate supply of fluid for introduction into the pump 58 when it is being operated. The pump 58, on the other hand, must supply very high pressures. In actual practice, pressures from 600 to 1000 pounds per square inch are employed in order to secure the very high pressure necessary to cause the injected liquid additive to pass through the skin of the fowl.

While the details of the nozzles and injector head do not form part of our invention, it is desirable that some means be employed for releasing the liquid additive suddenly through the nozzles. This may take the form, for example, of a snap action valve mechanism which opens abruptly when the pressure reaches the desired injecting pressure.

The piston rod 62 of pump 58 is operated by a hydraulic motor 82 which is of the reciprocating piston type. Hydraulic fluid is supplied to one side of the piston by supply pipe 83 and at the other side of the piston by pipe 84. Piston rod 62 is moved upwardly by hydraulic motor 82 when it is desired to force fluid through pipe 67 into the injector head 31. When injection is completed, the piston is moved downwardly by the motor 82.

Reference has been made to hydraulic fluid flowing through pipes 80, 81, 83, and 84. The means for forcing hydraulic fluid flow through these pipes will now be described. Located on a platform extension 87 of the main frame 10 are two hydraulic pump units 85 and 86. Each of these pump units include a container filled with hydraulic fluid and a rotary hudraulic pump immersed in the fluid. The conduit 80 previously referred to is connected to the outlet pump unit 85 and conduit 81 is connected to the inlet passage of the pump unit 85. Conduits 83 and 84 connected to the hydraulic cylinder 82 are connected to pump unit 86 which thus controls the operation of the hydraulic unit 82.

The pump units 85 and 86 are driven by electric motors 88 and 89, respectively. Located on the housings of pump units 85 and 86 are two accumulators 91 and 92, respectively. These accumulators serve to accumulate the hydraulic liquid under pressure and to deliver it to the hydraulic motors 79 and 82 in greater volume for a short period of time than would be possible if the liquid were supplied directly by the pumps driven by motors 88 and 89. Also extending upwardly from the housings of pump units 85 and 86 are two conduits 93 and 94 which support an electrical control box 96. As is evident from FIG. 5, this control box 96 has a series of switch buttons 98 extending thereacross. Also extending thereacross is a series of lights 99. One of the lights 99 is associated with each of the switch buttons 98 and acts as a pilot light to indicate that the circuit controlled by that switch is closed. One of the switches 98 is employed to control the energization of motor 88 and another to control energization of motor 89. Other of the switches 98 may be used to control various solenoid valves controlling the delivery of fluid through the conduits 80, 81, 83, and 84. The conduits 93 and 94 house various conductors extending between the switches 98 and the devices controlled by them.

It has previously been stated that post 21 carrying the table 12 is mounted in a guide 22 for vertical movement. Because of the pivoted links 24 and 25, this movement is parallel to the post 23 to which the links 24 and 25 are pivotally connected. Associated with the lowermost link 25 is a cam 100 which is secured to a shaft 101 shown schematically. The shaft 101 is, in turn, connected through a suitable mechanical connection 102 to a handle 103 associated with a calibrated dial 104. The calibrations 104 may, for example, be in terms of weight units representing possible weights of various fowl. After a fowl has been weighed or its weight estimated, a fowl is placed on the table 12 and the arm 103 is adjusted to assume a position corresponding to the weight of the turkey. This results in rotation of cam 100 to raise or lower lever 25 and hence to raise or lower the post 21 and thus the table 12. The advantage of this is that a fowl 38 can be moved to assume the optimum position with respect to the nozzles 35 and 36. It will be obvious that with a large bird, it is desirable to have the table 12 much lower than with a small bird. It is also to be noted that the lever 42, to which the clamping member 40 is secured, is pivotally secured at its base to a bracket 44 carried by the post 21. Thus, as post 21 is moved upwardly and downwardly, the clamping member 40 is similarly moved up or down so that its position with respect to the table 12 remains relatively constant. The importance of this is that initially when the fowl is first placed on the table with the backbone resting between the inner ones of the bars 17, the position of the rear end of the fowl is relatively constant with respect to the table, regardless of the size of the fowl. Hence, it is not desired to have the position of the table shift with respect to the clamping member 40.

It is desirable to adjust the amount of liquid injected by high pressure pump 58 through the nozzles 35 and 36 in accordance with the weight of the fowl. For this purpose, we have provided a switch 105. This is connected through conductors 106 and 107 to a solenoid valve 114 which controls the connection of conduit 83 from the pump unit 86 to hydraulic motor 82. The switch 105 is carried by a lever 109 pivoted at 110. The annular position of 109 and hence the vertical position of switch 105 is adjusted by a cam 111 also secured to shaft 101 and actuated through mechanical connection 102 by the arm 103. It will be obvious that as arm 103 is adjusted in accordance with the weight of the bird injected, the cam 111 is similarly adjusted to act on lever 109 to move the switch 105 up or down. Switch 105 is of the precision snap switch type having a button projecting downwardly therefrom. This button is designed to be engaged by a collar 112 secured to the piston rod 62. Obviously, as the hydraulic units 82 move the piston rod 62 upwardly to actuate piston 59 of the pump 58, a collar 112 will eventually engage the button of switch 105. When this happens, switch 105 is actuated to affect the energization of solenoid valve 114 to stop operation of the hydraulic unit 82. This results in termination of the pumping operation so that no more fluid is injected into the bird. The solenoid valve 114 may control the flow of hydraulic liquid through the hoses 83 and 84 in any suitable manner. For example, when the circuit including conductors 106 and 107 is interrupted by opening of switch 105, the solenoid valve 114 may be effective to interrupt the connection of conduit 83 to pump unit 86 and to connect conduit 83 to a return to the reservoir to permit the hydraulic fluid beneath the piston of hydraulic motor 82 to return to the reservoir.

While we have shown cams 100 and 111 both secured to the same shaft 101 and actuated together, it is obvious that, if desired, the two adjustments can be made independent of each other to provide more flexibility.

The conduit 81 supplying fluid to pump 79 is connected to a second solenoid valve 115. The solenoid valve 115, when deenergized, is effective to terminate flow of hydraulic fluid through pipes 80 and 81 and pump 79 even though the motor 88 is running. For example, solenoid valve 115 may interrupt the supply of fluid to supply pipe 81 and bypass it to the reservoir in the container of the pump unit 85. Thus, solenoid valve 115, like solenoid valve 114, controls whether liquid is supplied to the hydraulic motor 82 associated therewith.

OPERATION

When it is desired to inject fowl, an adequate supply of the additive is placed in container 50 and the pump 53 is started to circulate hot water through the heat exchanger 51 to insure that the additive, such as butter, is in a liquid state before the injecting operation is to start. The proper switch buttons 98 are actuated to start the motors 88 and 89 to, in turn, place into operation the pump units 85 and 86. Another of the switch buttons 98 is now operated to actuate the solenoid 115 to admit hydraulic fluid to the hose 81 and to interrupt its bypass connection with the reservoir. This causes a flow of hydraulic fluid through the hoses 80 and 81 to actuate the hydraulic motor 79 to, in turn, operate pump 78. This causes liquid additive to flow from the supply line 77 through pump 78, pipe 70, inlet passage 67 of pump 58, pipe 72, the annular passage 76 in injector head 31, pipe 73, restrictor 69 and pipe 71 back to the tank 50 containing the liquid additive. As soon as this has taken place for a sufficient period of time to cause the injector head 31 to be warmed up, it is now possible to inject liquid additive into a fowl.

A fowl is now placed on the table 12 with the backbone of the fowl disposed between the inner bars 17 so that the fowl tends to remain parallel to the longitudinal axis of the table 12. After the weight of the bird has been determined either by estimating it or by weighing it, the arm 103 is adjusted to adjust the vertical height of table 12 to a position corresponding to that of the weight of the bird. Where there is an interlock between the adjusting mechanism for the height of the table 12 and the means for controlling the amount of liquid injected, as shown, the position of switch 105 is also adjusted by operation of arm 103. As previously pointed out, the vertical adjustment of table 12 also results in a vertical adjustment of the height of the pivot point 43 of the bar 42 carrying the clamping member 40. The handle 45 is now grasped and pulled forwardly to move the fowl 38 towards the nozzles 35 and 36 until the nozzles 35 and 36 firmly engage the breast of the fowl. Another one of the switch buttons 98 is now actuated to cause solenoid valve 114 to be operated to admit fluid to conduit 83 and to interrupt its bypass connection with the reservoir. This causes operation of hydraulic motor 82 to force the piston rod 62 upwardly. The upper movement of piston rod 62 forces piston 59 of pump 58 upwardly to force fluid under very high pressure such as, for example, from 600 to 1,000 pounds per square inch. The disposition of the nozzles and the high pressure at which the additive is introduced causes the additive to penetrate the fowl through the skin without appreciably rupturing the same and causes the additive to penetrate through a substantial portion of the fowl. The angular disposition of the nozzles with respect to the pectoral muscles tends to cause the liquid additive to "splatter" within the fowl as it hits the various muscle walls. As soon as the piston has moved an amount corresponding to the desired injection of the fluid, the collar 112 engages the button of switch 105 to deenergize the solenoid valve 114, interrupting the connection of pump 86 to line 83 and connecting this line to a bypass to the reservoir in the pump unit 86. The injecting process is now completed and the handle 45 can be released.

When the handle 45 is initially drawn forward to force the fowl 38 against the nozzles 35 and 36, the cooperative effect of the clamping member 40 and the nozzles 35 and 36 tends to compress the fowl. This tends to prevent the escape of liquid additive during the injecting operation from around the nozzles and through the posterior portion of the turkey. As soon as the injecting operation is completed and the handle 45 is released, the fowl tends to expand again to substantially its original shape. Because of this sudden expansion of the bird 38, the liquid tends to be retained in the bird. In other words, while the bird is under compression, it is held between the nozzles 35 and 36 and the clamping member 40 and its volume is reduced somewhat. Upon the sudden expansion of the bird after release of the clamping member 40, there is no longer any tendency for the fluid to leave the bird since the volume within the bird is greater than at the time of injection. It is thus possible with our arrangement to have a minimum amount of liquid additive lost as a result of the injecting operation.

As soon as the injecting operation is completed, the switch button 98 controlling solenoid valve 114 is actuated to prevent re-energization of solenoid valve 114 until another fowl has been placed on the table 12. Reclosure of the valve will again cause fluid to flow through conduit 83, through the underside of the piston of hydraulic motor 82 to again repeat the operation.

With the apparatus shown, it is possible to rapidly inject the desired amount of fluid into one fowl after another. The proper amount of additive is injected at the proper angle through the pectoral muscles. There is no noticeable rupture of the skin of the fowl and the liquid additive is well distributed through the fowl.

While we have shown a specific embodiment of our apparatus for purposes of illustration and have described a specific method, it is to be understood that the scope of the invention is to be limited solely by the scope of the appended claims.

We claim as our invention:

1. Apparatus for injecting a fluid additive into the flesh of a fowl to improve the eating qualities thereof, said apparatus comprising:
    a table for supporting the fowl,
    a plurality of nozzles supported with respect to said table disposed so as to engage the breast of a fowl placed on the support on opposite sides of the longitudinal center of the fowl.
    fluid delivery means for delivering to said nozzles a fluid additive under sufficiently high pressure that said fluid additive penetrates the skin of a fowl engaging said nozzles without substantial rupture of said skin,
    a posterior engaging member also supported with respect to said table and designed to engage and partially surround the posterior portion of a fowl, and
    means for causing relative movement of said nozzles and said posterior engaging member to clamp a fowl on said table against said nozzles.

2. The apparatus of claim 1 in which the nozzles are fixedly secured with respect to said table, in which said posterior engaging member is movable with respect to said table to act as a clamping member, and in which said means for causing relative movement of said nozzles and said posterior engaging portion is a means for moving said posterior engaging member towards said nozzles to clamp the fowl therebetween.

3. The apparatus of claim 1 in which the table and nozzles are relatively adjustable in a vertical direction to accommodate the apparatus for fowl of various weights and to insure correct positioning of said nozzles with respect to the breast of the fowl despite such variations in weight and hence of size of the fowl.

4. The apparatus of claim 3 in which the nozzles are fixed in a vertical direction and the table is vertically adjustable with respect to the nozzles and the posterior engaging member.

5. The apparatus of claim 1 in which said fluid delivery means includes a piston and a cylinder in fluid communication with said nozzles, and means for adjusting the stroke of the piston and hence the amount of fluid additive introduced into the fowl.

6. The apparatus of claim 1 in which the table has guide means to engage the fowl to maintain the longitudinal axis of the fowl parallel to the longitudinal axis of the table.

7. The apparatus of claim 1 in which said plurality of nozzles comprises two groups of nozzles varying in length and disposition with respect to each other so that their terminal portions approximately conform with the breast of a typical fowl.

8. The apparatus of claim 7 in which the passages through the nozzles adjacent the portions of the fowl having the larger amounts of flesh to be injected are larger than those through other of the nozzles so that a greater amount of fluid additive is introduced into the portions of the fowl having the greater amount of flesh to be injected.

9. Apparatus for injecting a fluid into an object having opposite end portions each converging towards its outer end, said apparatus comprising:

a table for supporting the object to be injected, a nozzle assembly supported with respect to said table and comprising a housing and a plurality of nozzles projecting from said housing and extending outwardly to varying extents to conform with a portion of the surface of one end portion of such an object, means for delivering to said nozzles a fluid additive under high pressure for injection into such an object, a member also supported with respect to said table and designed to engage and partially surround the opposite end of such an object, and means for causing relative movement of said nozzle assembly and said last named member to clamp such an object against the nozzles.

10. The apparatus of claim 9 in which the table and nozzles are relatively adjustable in a vertical direction so as to insure that the nozzles are properly positioned with respect to the object being injected, despite different sizes of the objects being injected.

11. The apparatus of claim 1 in which the means for causing relative movement of said nozzles and said posterior engaging member is capable of sufficient clamping force upon the fowl that said nozzles all firmly engage the breast of the fowl and that the fowl is compressed to prevent the escape of the injected fluid additive.

12. The apparatus of claim 11 in which said means for causing relative movement of said nozzles and said posterior member is quickly releasable to enable the fowl to quickly return to its original shape following the injecting operation to prevent escape of the fluid additive.

* * * * *